United States Patent
Hu et al.

(10) Patent No.: US 8,446,886 B2
(45) Date of Patent: May 21, 2013

(54) ANTENNA PORT MAPPING FOR DEMODULATION REFERENCE SIGNALS

(75) Inventors: Yang Hu, Beijing (CN); David Astely, Bromma (SE); David Hammarwall, Stockholm (SE); George Jöngren, Stockholm (SE); Xinghua Song, Beijing (CN); Jianfeng Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 241 days.

(21) Appl. No.: 12/900,628

(22) Filed: Oct. 8, 2010

(65) Prior Publication Data

US 2011/0176517 A1 Jul. 21, 2011

(30) Foreign Application Priority Data

Jan. 20, 2010 (WO) ................ PCT/CN2010/000084

(51) Int. Cl.
*H04W 72/04* (2009.01)

(52) U.S. Cl.
USPC .......................................... 370/335

(58) Field of Classification Search
USPC ........................................... 370/335
See application file for complete search history.

(56) References Cited

U.S. PATENT DOCUMENTS

| 2008/0063115 A1* | 3/2008 | Varadarajan et al. ......... 375/299 |
| 2011/0142107 A1* | 6/2011 | Pan et al. ...................... 375/219 |
| 2012/0106595 A1* | 5/2012 | Bhattad et al. ................ 375/146 |

FOREIGN PATENT DOCUMENTS

WO WO2011085509 7/2011

OTHER PUBLICATIONS

3GPP TS 36.211 V8.6.0 (Mar. 2009), Evolved Universal Terrestrial Radio Access (E-UTRA); Physical Channels and Modulation; 83 pages.
3GPP TR 36.814 V1.5.0 (Nov. 2009), Further Advancements for E-UTRA, Physical Layer Layer Aspects; 53 pages.
3GPP TSG RAN WG1 Meeting #58bis Chairman's notes; Oct. 12-16, 2009; Miyazaki, Japan; 33 pages.
3GPP TSG RAN WG1 Meeting #59 Chairman's notes; Nov. 9-13, 2009; Jeju, Korea; 34 pages.
3GPP TSG-RAN WG1 #59bis, R1-100046, DM RS design for rank Jan. 5-8; 18-22, 2010; Valencia, Spain; 6 pages.
3GPP TSG RAN WG1 Meeting #59 bis, R1-100496, Downlink DM-RS Structure for Rank 5-8 in LTE-Advanced; Jan. 18-22, 2010; Valencia, Spain; 9 pages.

* cited by examiner

*Primary Examiner* — Sulaiman Nooristany
(74) *Attorney, Agent, or Firm* — Coats & Bennett, P.L.L.C.

(57) ABSTRACT

The present invention provides a unified, rank independent mapping between antenna ports and group/code pairs. Each antenna port is uniquely associated with one code division multiplexing (CDM) group and one orthogonal cover code (OCC). The mapping between antenna ports and group/code pairs is chosen such that, for a given antenna port, the CDM group and OCC will be the same for every transmission rank.

16 Claims, 10 Drawing Sheets

ANTENNA PORT MAPPING FOR DEMODULATION REFERENCE SIGNALS

RELATED APPLICATION

This application claims the benefit under 35 U.S.C. §119 of PCT/CN2010/000084 filed on Jan. 20, 2010. That application, which is entitled "Antenna Port Mapping for Demodulation Reference Signals," is incorporated herein by reference in its entirety.

BACKGROUND

The present invention relates generally to demodulation reference signals (DM-RSs) for LTE and LTE advanced communication systems and, more particularly, to the configuration of antenna ports for user-specific DM-RSs.

The 3rd Generation Partnership Project (3GPP) is responsible for the standardization of UMTS (Universal Mobile Telecommunication Service) system and LTE (Long Term Evolution). LTE is a communication technology for realizing high-speed packet-based communication that can reach high data rates both in the downlink and in the uplink, which is thought as a next generation mobile communication system of the UMTS system. The 3GPP work on LTE is also referred to as E-UTRAN (Evolved Universal Terrestrial Access Network). The first release of LTE, referred to as release-8 (Rel-8) can provide peak rates of 100 Mbps, a radio-network delay of, e.g., 5 ms or less, a significant increase in spectrum efficiency and a network architecture designed to simplify network operation, reduce cost, etc. In order to support high data rates, LTE allows for a system bandwidth of up to 20 MHz. LTE is also able to operate in different frequency bands and can operate in both FDD (Frequency Division Duplex) and TDD (Time Division Duplex) modes. The modulation technique or the transmission scheme used in LTE is known as OFDM (Orthogonal Frequency Division Multiplexing).

For the next generation mobile communications system, e.g., IMT-advanced (International Mobile Telecommunications) and/or LTE-advanced, which is an evolution of LTE, support for bandwidths of up to 100 MHz is being discussed. LTE-advanced can be viewed as a future release of the LTE standard and since it is an evolution of LTE, backward compatibility is important so that LTE-advanced can be deployed in spectrum already occupied by LTE. In both LTE and LTE-advanced radio base stations known as evolved NodeBs (eNBs or eNodeBs), multiple-input, multiple output (MIMO) antenna configurations and spatial multiplexing can be used in order to provide high data rates to user terminals. Another example of a MIMO-based system is WiMAX (Worldwide Interoperability for Microwave Access) system.

To carry out coherent demodulation of different downlink physical channels, the user terminal needs estimates of the downlink channel. More specifically, in the case of OFDM transmissions, the user terminal needs an estimate of the complex channel of each subcarrier. One way to enable channel estimation in the case of OFDM transmissions is to insert known reference symbols into the OFDM time frequency grid. In LTE, these reference symbols are jointly referred to as downlink reference signals.

Two types of downlink reference signals are used in LTE systems: cell specific downlink reference signals and user specific downlink reference signals. Cell specific downlink reference signals are transmitted in every downlink subframe, and span the entire downlink cell bandwidth. The cell specific reference signals can be used for channel estimation and coherent demodulation except when spatial multiplexing is used. A user terminal specific reference signal is used for channel estimation and demodulation of the downlink shared channel when spatial multiplexing is used. The user specific reference signals are transmitted within the resource blocks assigned to the specific user terminal for transmitting data on the downlink shared channel. The user terminal specific reference signals are subject to the same precoding as data signals transmitted to the user terminal. The present invention is applicable to user terminal specific downlink reference signals.

FIG. 1 illustrates a portion of an exemplary OFDM time-frequency grid 50 for LTE. Generally speaking, the time-frequency grid 50 is divided into one millisecond subframes. One subframe is shown in FIG. 1. Each subframe includes a number of OFDM symbols. For a normal cyclic prefix (CP) link, suitable for use in situations where multipath dispersion is not expected to be extremely severe, a subframe comprises fourteen OFDM symbols. A subframe comprises twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element. A resource element comprises one OFDM symbol on one subcarrier.

For purposes of scheduling transmission on the downlink shared channel (DL-SCH), the downlink time-frequency resources are allocated in units called resource blocks (RBs). Each resource block spans twelve subcarriers (which may be adjacent or distributed across the frequency spectrum) and one-half of one subframe. The term "resource block pair" refers to two consecutive resource blocks occupying an entire one millisecond subframe.

Certain resource elements within each subframe are reserved for the transmission of downlink reference signals. FIG. 1 illustrates one exemplary resource allocation pattern for the downlink reference signals to support downlink transmissions up to rank 4. Twenty-four resource elements within a subframe are reserved for transmission of the downlink reference signals. More specifically, the demodulation reference signals are carried in OFDM symbols 5, 6, 12, and 13 (i.e., the sixth, seventh, thirteenth, and fourteenth symbols) of the OFDM subframe. The resource elements for the demodulation reference signals are distributed in the frequency domain.

The resource elements for the demodulation reference signals are divided into two code division multiplexing (CDM) groups referred to herein as CDM Group 1 and CDM Group 2. In LTE systems supporting transmission ranks from 1-4, two CDM groups are used in combination with length-2 orthogonal cover codes (OCCs). The orthogonal cover codes are applied to clusters of two reference symbols. The term "cluster" as used herein refers to groupings of adjacent (in the time domain) reference symbols in the same subcarrier. In the embodiment shown in FIG. 1, the subcarriers containing demodulation reference symbols include two clusters each.

FIG. 2 illustrates an exemplary allocation of resource elements for a spatial multiplexing system supporting transmission ranks up to eight. It may be noted that the resource allocation pattern is the same as the allocation pattern shown in FIG. 1. To support higher transmission ranks, a length-4 OCC is used instead of a length-2 OCC. The length-4 OCC is applied across two clusters of resource elements.

Up to eight antenna ports may be defined to support up to 8 spatial layers. The 8 antenna ports can be mapped to two CDM groups, each using four OCCs. Thus, the antenna ports can be uniquely identified by two parameters, i.e., CDM group index and OCC index, referred to herein as an index pair. Currently, the mapping between antenna ports and index pairs has not been specified in the LTE standard. Some mappings may be rank dependent, which requires that different port mappings be used for each transmission rank. Using different port mappings for different transmission ranks imposes a burden on the user terminal, which must perform channel estimation differently when the transmission ranks changes.

SUMMARY

The present invention provides a unified, rank independent mapping between antenna ports and group/code pairs. Each antenna port is uniquely associated with one code division multiplexing (CDM) group and one orthogonal cover code (OCC). The mapping between antenna ports and group/code pairs is chosen such that, for a given antenna port, the CDM group and OCC will be the same for every transmission rank.

One exemplary embodiment of the invention comprises a method implemented by a base station for transmitting demodulation reference signals to a user terminal. The method comprise determining a transmission rank for a downlink transmission to said user terminal; determining one or more reference signal antenna ports for said downlink transmission based on said transmission rank, wherein each port is defined by an group/code pair comprising a code division multiplexing group and orthogonal cover code; mapping reference signal antenna ports to group/code pairs for each transmission rank such that the code division multiplexing group and code orthogonal cover code are the same for a given antenna port for every transmission rank; and transmitting said downlink reference symbols over said reference signal antenna ports.

Yet another exemplary embodiment of the invention comprises a base station configured to implement the method described above.

Another exemplary embodiment of the invention comprises a method implemented by a user terminal for receiving demodulation reference signals transmitted by a base station. The user terminal method comprises determining a transmission rank for a downlink transmission to said user terminal; determining one or more reference signal antenna ports for said downlink transmission based on said transmission rank, wherein each port is defined by an group/code pair comprising a code division multiplexing group and orthogonal cover code; mapping reference signal antenna ports to group/code pairs for each transmission rank such that the code division multiplexing group and orthogonal cover code are the same for a given antenna port for every transmission rank; and receiving said downlink reference symbols over said reference signal antenna ports corresponding to the transmission rank.

Yet another exemplary embodiment of the invention comprises a user terminal configured to implement the method described above.

DETAILED DESCRIPTION

Figure 1:
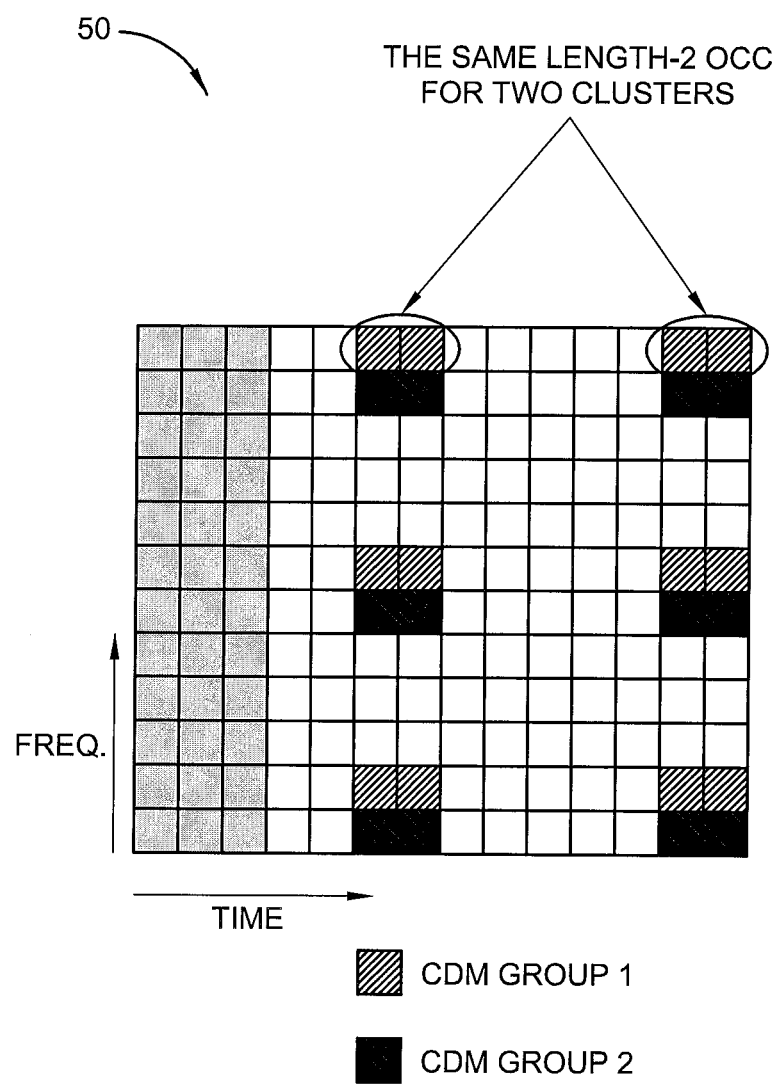
FIG. 1 illustrates the allocation of resource elements in an OFDM system for demodulation reference signals to support transmission ranks up to 4.
Figure 2:
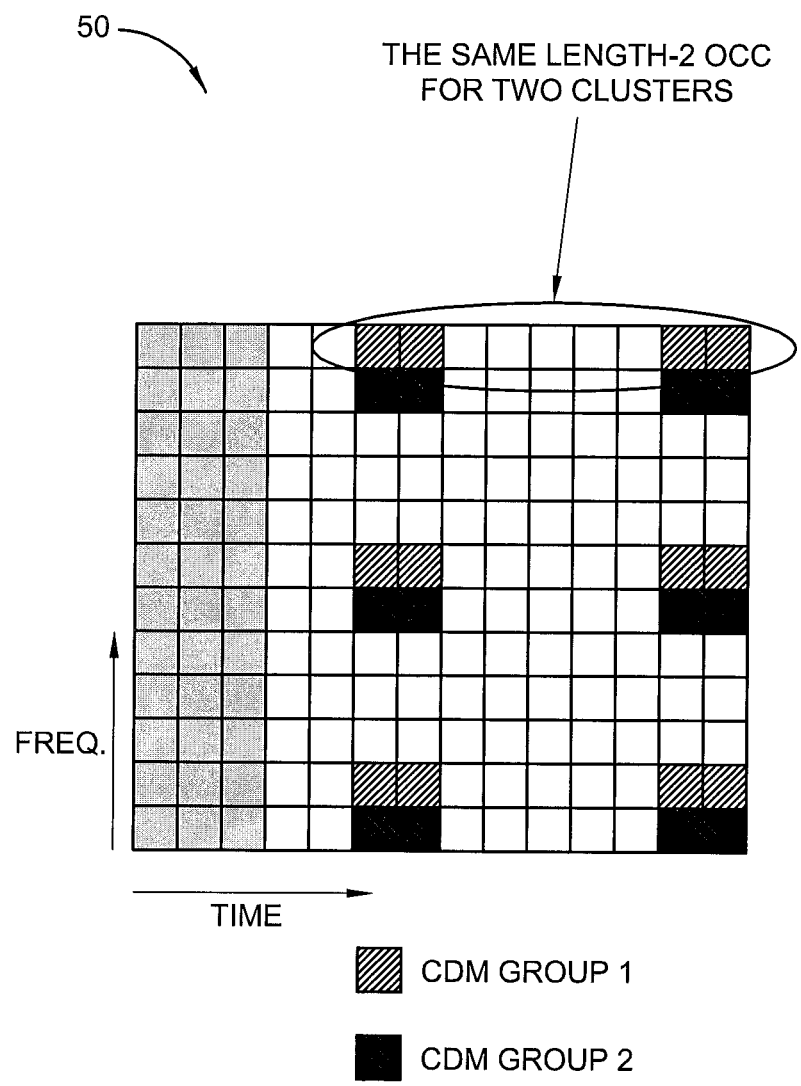
FIG. 2 illustrates the allocation of resource elements in an OFDM system for demodulation reference signals to support transmission ranks up to 8.
Figure 3:
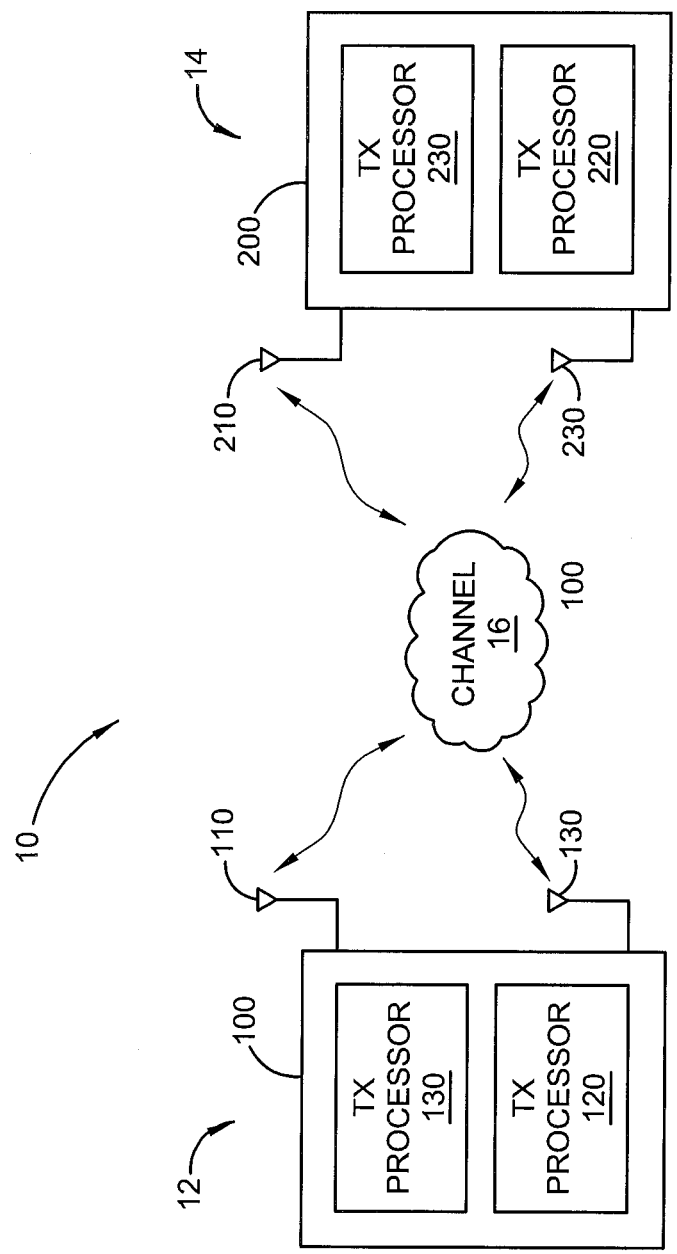
FIG. 3 illustrates an exemplary MIMO communication system.

FIG. 3 illustrates a multiple input/multiple output (MIMO) wireless communication system 10 including a base station 12 (called an evolved NodeB in LTE), and a user terminal 14. The present invention will be described in the context of an LTE system, although the present invention is applicable to other types of communication systems. The base station 12 includes a transmitter 100 for transmitting signals to the second station 14 over a communication channel 16, while the user terminal 14 includes a receiver 200 for receiving signals transmitted by the base station 12. Those skilled in the art will appreciate that the base station 12 and user terminal 14 may each include both a transmitter 100 and receiver 200 for bi-directional communications.

An information signal is input to the transmitter 100 at the base station 12. The transmitter 100 includes a controller 110 to control the overall operation of the transmitter 100 and a transmit signal processor 120. The transmit signal processor 120 performs error coding, maps the input bits to complex modulation symbols, and generates transmit signals for each transmit antenna 130. After upward frequency conversion, filtering, and amplification, transmitter 100 transmits the transmit signals from respective transmit antennas 130 through the communication channel 16 to the user terminal 14.

The receiver 200 at the user terminal 14 demodulates and decodes the signals received at each antenna 230. Receiver 200 includes a controller 210 to control operation of the receiver 200 and a receive signal processor 220. The receive signal processor 220 demodulates and decodes the signal transmitted from the first station 12. The output signal from the receiver 200 comprises an estimate of the original information signal. In the absence of errors, the estimate will be the same as the original information signal input at the transmitter 12.

Figure 4:
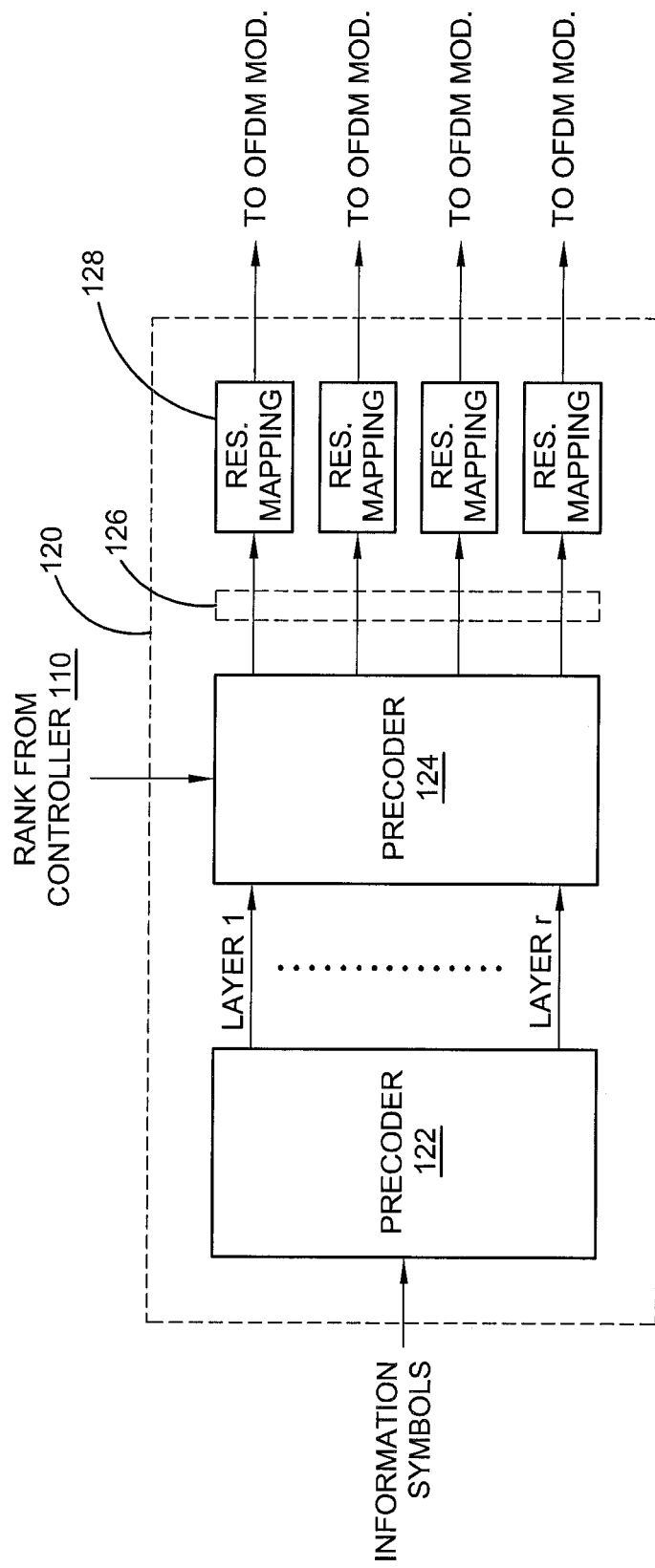
FIG. 4 illustrates an exemplary transmit signal processor for an OFDM system.

In LTE systems, spatial multiplexing can be used when multiple antennas are present at both the base station 12 and the user terminal 14. FIG. 4 illustrates the main functional components of a transmit signal processor 120 for spatially multiplexing. The transmit signal processor 120 comprises a layer mapping unit 122, a precoder 124, and resource mapping units 128. A sequence of information symbols (data symbols or reference symbols) is input to the layer mapping unit 122. The symbol sequence is divided into one or two codewords. The layer mapping unit 122 maps the codewords into $N_L$ layers depending on the transmission rank. It should be noted that the number of layers does not necessarily equal the number of antennas 130. Different codewords are typically mapped to different layers; however, a single codeword may be mapped to one or more layers. The number of layers corresponds to the selected transmission rank. After layer mapping, a set $N_L$ symbols (one symbol from each layer) are linearly combined and mapped to $N_A$ antenna ports 126 by precoder 124. The combining/mapping is described by a precoder matrix of size $N_A \times N_L$. The resource mapping unit 128 maps symbols to be transmitted on each antenna port 126 to the resource elements assigned by the MAC scheduler.

When a user terminal 14 is scheduled to receive a downlink transmission on the downlink shared channel (DL-SCH), the MAC scheduler at the transmitting station 12 allocates one or more resource block pairs to the user terminal 14. As previously noted, certain resources elements in each resource block are reserved for downlink reference signals. To support downlink transmission containing up to eight layers, user terminal specific downlink reference signals are needed for eight layers. According to the present invention, eight distinct reference signal antenna ports are defined to support transmissions with up to eight layers. Each antenna port is uniquely associated with one code division multiplexing (CDM) group and one orthogonal cover code (OCC). The OCC may comprise, for example, a length-2 or length-4 Walsh code, although or orthogonal codes could also be used. For convenience, the CDM groups may be identified by a group index having a value from 1 to 2, and the OCC may be identified by a code index having a value from 1 to 4. The combination of a CDM group and OCC is referred herein as a group/code pair.

In the exemplary embodiment, there are two CDM groups and 4 OCCs. Thus, there eight possible combinations of CDM groups and OCCs (2 groups×4 OCCs) so that eight layers can be supported. The mapping between antenna ports and group/code pairs is designed to be rank independent. More specifically, the mapping between antenna ports and group/code pairs is chosen such that, for a given antenna port, the CDM group and OCC will be the same for every transmission rank.

Figure 5A:
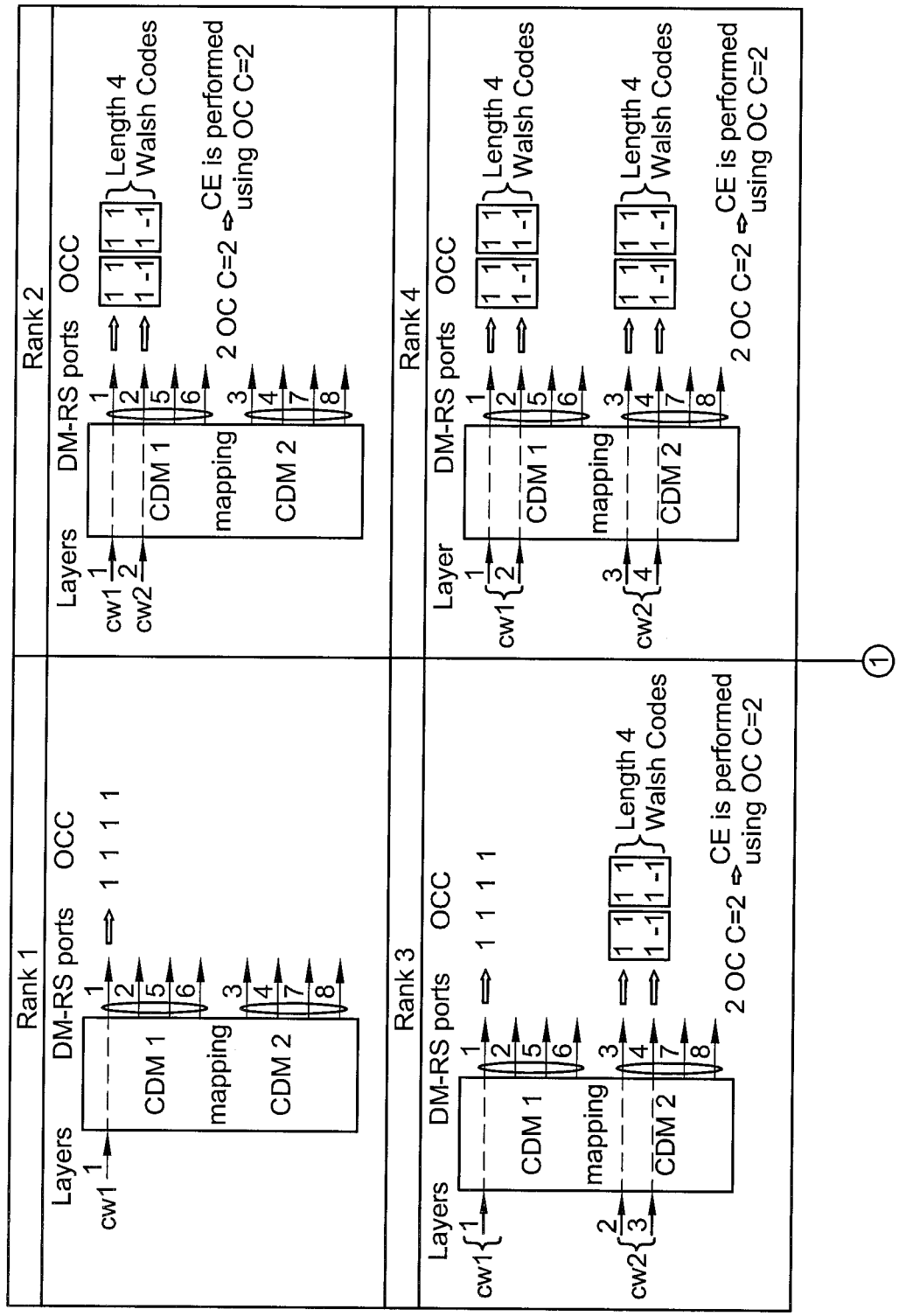
FIGS. 5a-5b illustrates the mapping of codewords to layers according to one exemplary embodiment for transmission ranks from 1 to 8.
Figure 5B:
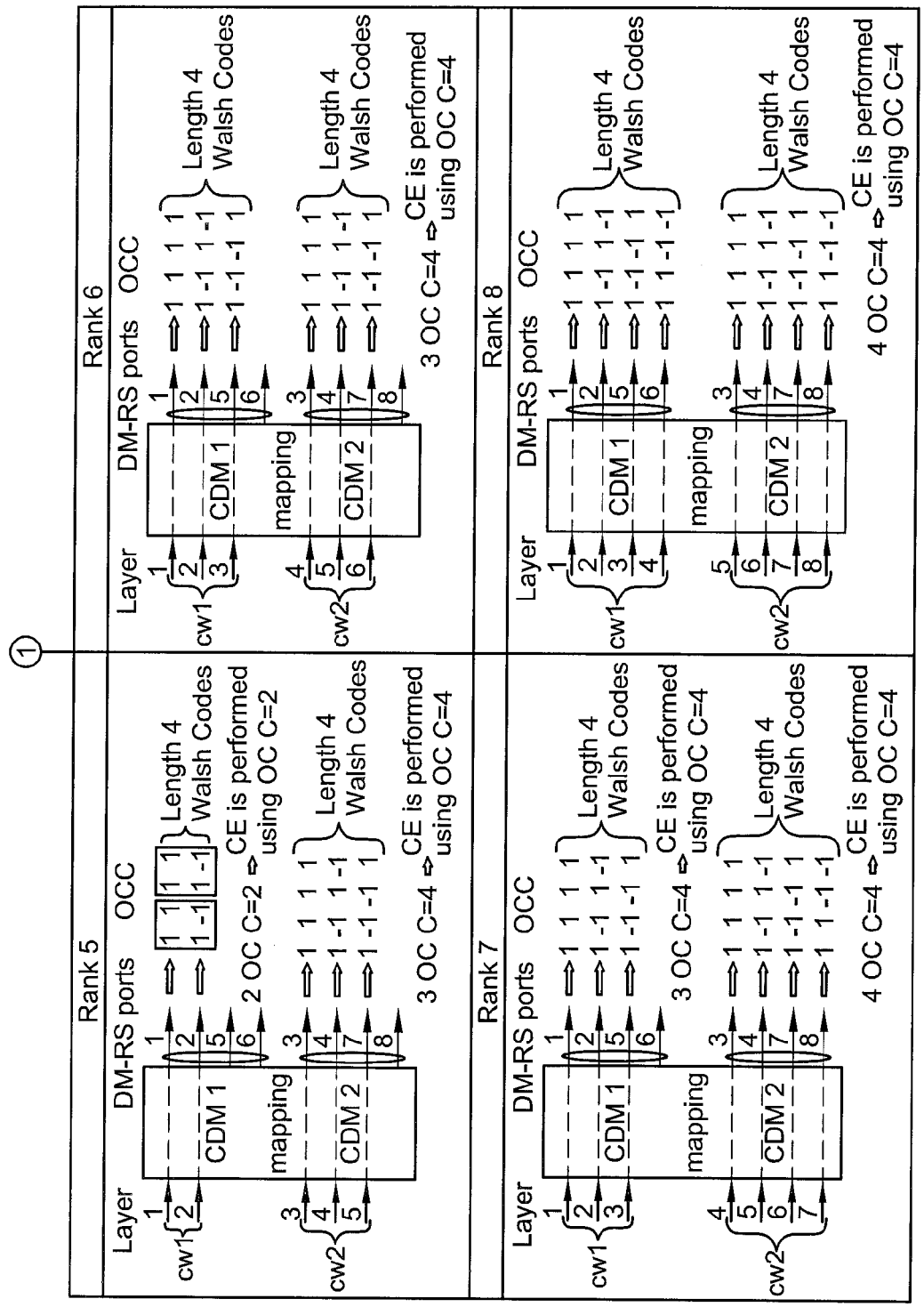

Table 1 below and FIGS. 5a and 5b illustrate one possible mapping between antenna ports and group/code pairs according to one embodiment of the present invention.

TABLE 1

Antenna Port Mapping

| Antenna port | CDM Group | OCC |
|---|---|---|
| 1 | 1 | 1 |
| 2 | 1 | 2 |
| 3 | 2 | 1 |
| 4 | 2 | 2 |
| 5 | 1 | 3 |
| 6 | 1 | 4 |
| 7 | 2 | 3 |
| 8 | 2 | 4 |

The OCCs are the Walsh codes given by the Walsh code matrix:

$$\begin{bmatrix} 1 & 1 & 1 & 1 \\ 1 & -1 & 1 & -1 \\ 1 & -1 & -1 & 1 \\ 1 & 1 & -1 & -1 \end{bmatrix} \begin{matrix} OCC1 \\ OCC2 \\ OCC3 \\ OCC4 \end{matrix}$$

The antenna port mapping shown in Table 1 allocates CDM group 1 to ports 1, 2, 5, and 6 and CDM group 2 to ports 3, 4, 7, and 8. OCC 1 is allocated to ports 1 and 3, OCC2 is allocated to ports 2 and 4, OCC 3 is allocated to ports 5 and 7, and OCC 4 is allocated to ports 6 and 8.

This antenna port mapping described above is rank independent so that a given antenna port will always use the same CDM group and OCC regardless of the transmission rank.

Further, the antenna ports associated with a particular CDM group possess a nesting property. That is, for the set of the antenna ports associated with a given CDM group, the antenna ports used for a low transmission rank will be a subset of the antenna ports used for a higher transmission rank. Thus, for the antenna ports associated with CDM group 1, the ports used for transmission rank 1 are a subset of the ports used for transmission rank 2, which are a subset of the ports used for transmission rank 5, which are a subset of the ports used for transmission rank 6. The same nesting property applies to the antenna ports associated with CDM group 2.

Another useful property of the antenna port mapping shown above is that the length-4 OCCs on certain antenna ports are identical to length-2 OCCs. For example, for transmission rank 2, the length-4 Walsh codes on antenna ports 1 and 2 appear the same as length-2 Walsh codes. In the case of single-user MIMO systems, this property enables the user terminal 14 to use length-2 OCCs to perform channel estimation. Using length-2 OCCs for channel estimation allows the receiver 200 to interpolate and thus provide more accurate channel estimates. Improved channel estimation is beneficial for high mobility user terminals 14. Thus, for transmission ranks 2, 4 and 5, the receiver may use length-2 Walsh codes to perform channel estimation on antenna ports 1 and 2 as shown in FIG. 5. Similarly, for transmission ranks 3 and 4, the receiver may use length-2 Walsh codes to perform channel estimation on antenna ports 3 and 4. When more than two layers are multiplexed into one CDM group, length-4 OCC should be used for channel estimation.

Figure 6A:
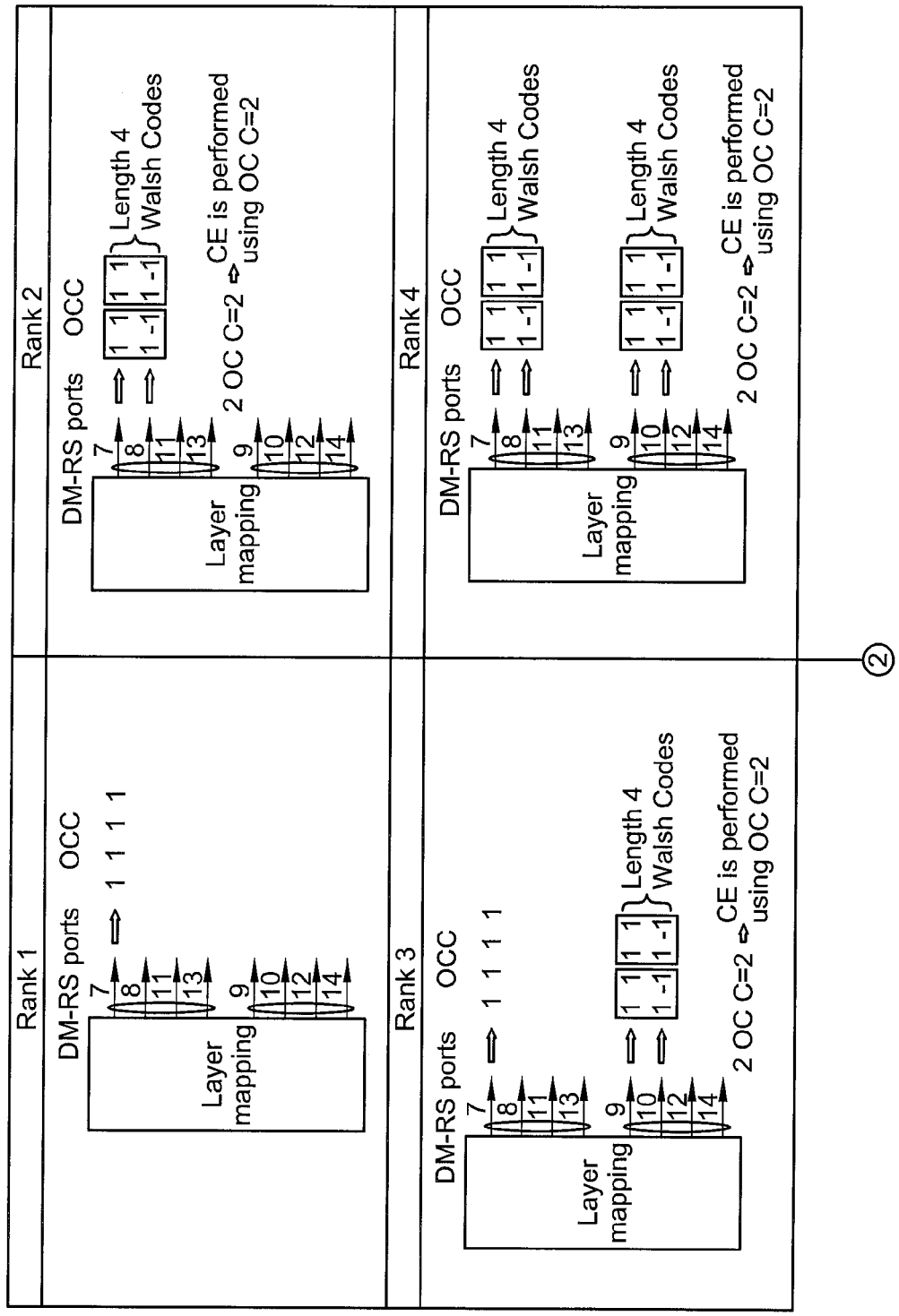
FIGS. 6a-6b illustrates the mapping of codewords to layers according to one exemplary embodiment for transmission ranks from 1 to 8.
Figure 6B:
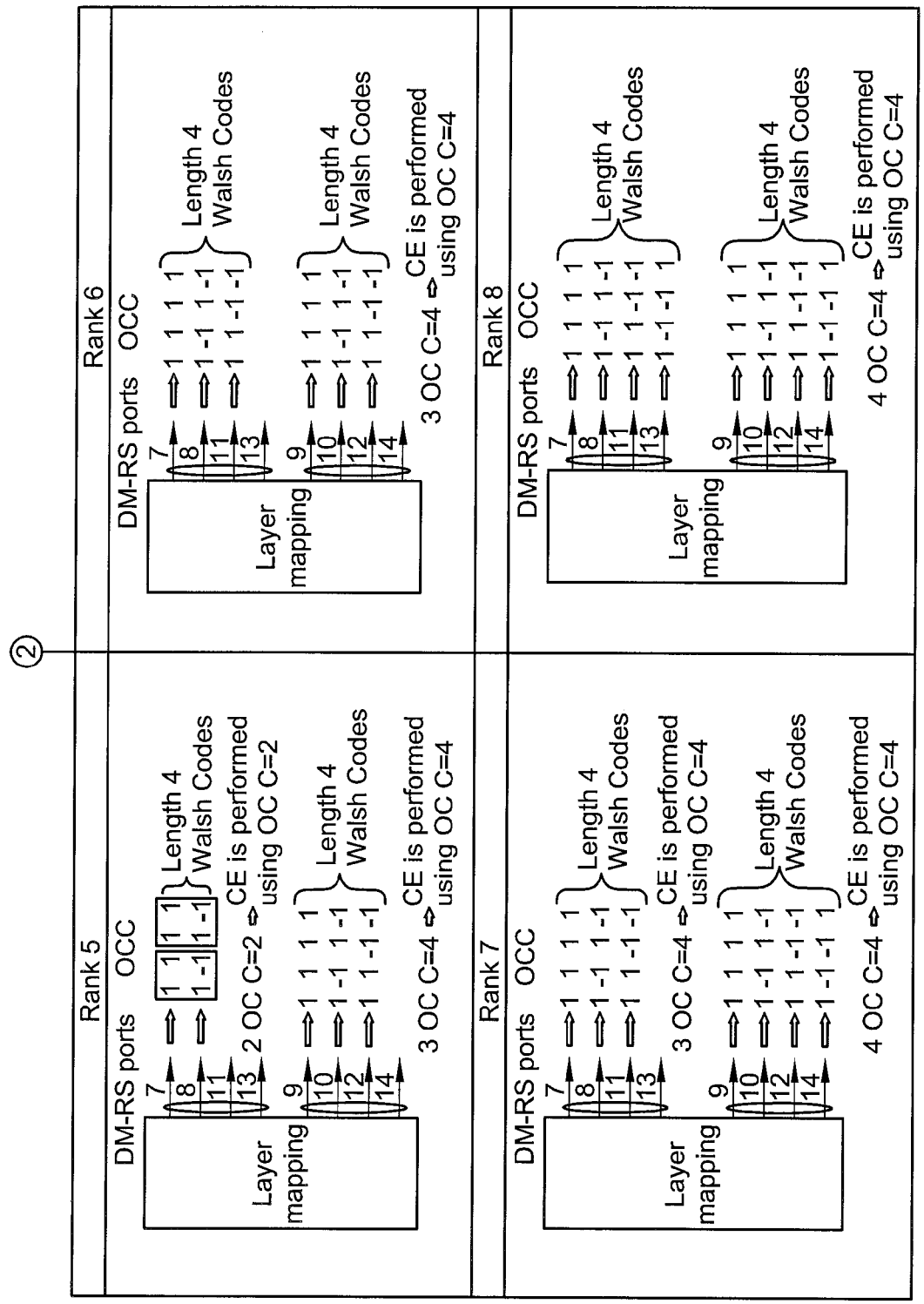

Table 2 below and FIGS. 6a and 6b illustrate an alternate antenna port mapping according to another exemplary embodiment of the invention.

TABLE 2

Antenna Port Mapping

| Antenna port | CDM Group | OCC |
|---|---|---|
| 7 | 1 | 1 |
| 8 | 1 | 2 |
| 9 | 2 | 1 |
| 10 | 2 | 2 |
| 11 | 1 | 3 |
| 13 | 1 | 4 |
| 12 | 2 | 3 |
| 14 | 2 | 4 |

In this alternative antenna port mapping, the OCCs are the Walsh codes given by the Walsh code matrix:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{matrix} OCC1 \\ OCC2 \\ OCC3 \\ OCC4 \end{matrix}$$

The antenna port mapping shown in Table 2 allocates CDM group 1 to ports 7, 8, 11, and 13 and CDM group 2 to ports 9, 10, 12, and 14. OCC 1 is allocated to ports 7 and 9, OCC2 is allocated to ports 8 and 10, OCC 3 is allocated to ports 11 and 12, and OCC 4 is allocated to ports 13 and 14.

It should be noted that CDM/OCC allocation only are considered here without regard to OCC mapping. With OCC mapping, OCC allocation could be varying from subcarrier to subcarrier in the frequency domain.

For multi-user MIMO, the user terminal 14 may not know whether other user terminals 14 are co-scheduled at the same time, such as when transparent MU-MIMO is used. This lack of knowledge forces each user terminal 14 to use length-4 OCC for channel estimation even for lower rank, which can degrade performance a bit more, especially for high speed case. In order to exploit the advantage of length-2 OCC, we propose to introduce 1-bit OCC length flag in control signaling to provide the user terminal 14 some more information on OCC details, which can accordingly improve the performance in MU-MIMO. Therefore, this 1-bit flag can also enable dynamic SU/MU switching well.

Figure 7:
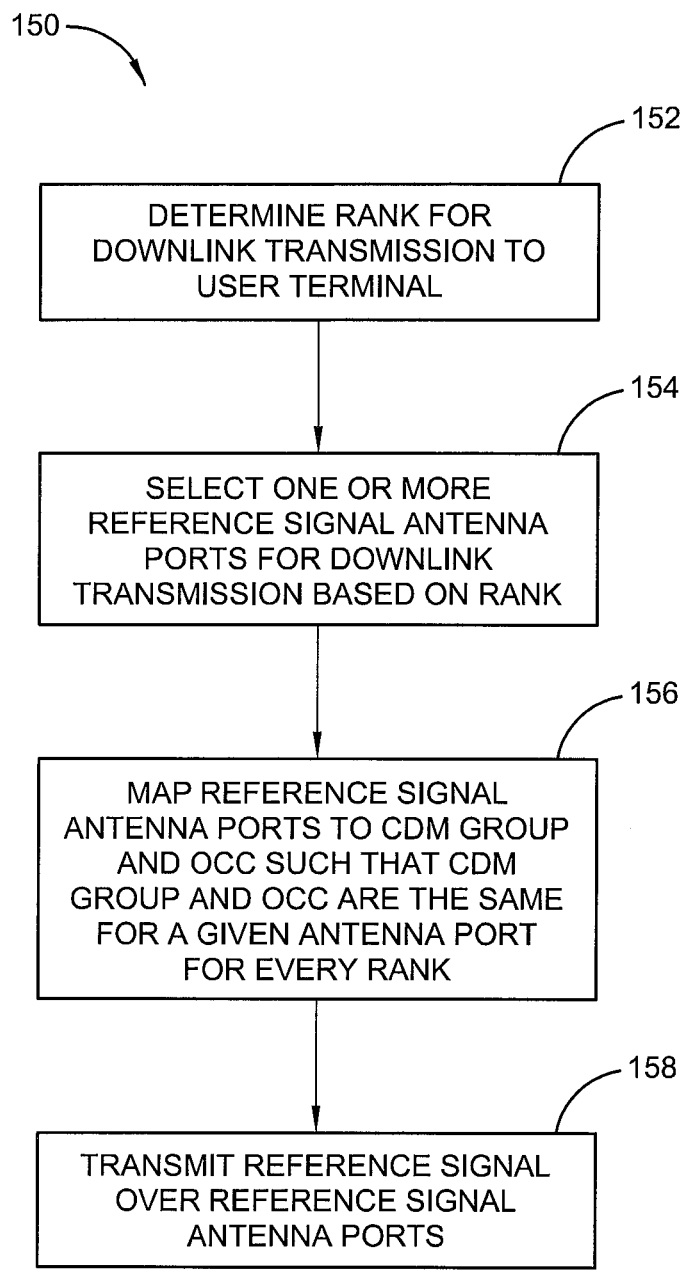
FIG. 7 illustrates an exemplary method for transmitting demodulation reference signals.

FIG. 7 illustrates an exemplary method 150 implemented by the base station 12 for transmitting demodulation reference signals to a user terminal 14. When a user terminal 14 is scheduled to receive a downlink transmission on the downlink shared channel (DL-SCH), the base station 12 determines the transmission rank for the downlink transmission to the user terminal 14 (block 152) and determines one or more reference signal antenna ports for the downlink transmission based on the transmission rank (block 154). The transmit signal processor 130 at the base station 12 is configured to map the antenna ports to a particular CDM group and orthogonal cover code such that the CDM group and orthogonal cover code are the same for a given antenna port for every transmission rank. The transmit signal processor 130 maps the demodulation reference signal to the reference signal antenna ports (block 156) corresponding to the transmission rank and transmits the demodulation reference signals over the selected antenna ports (block 158).

Figure 8:
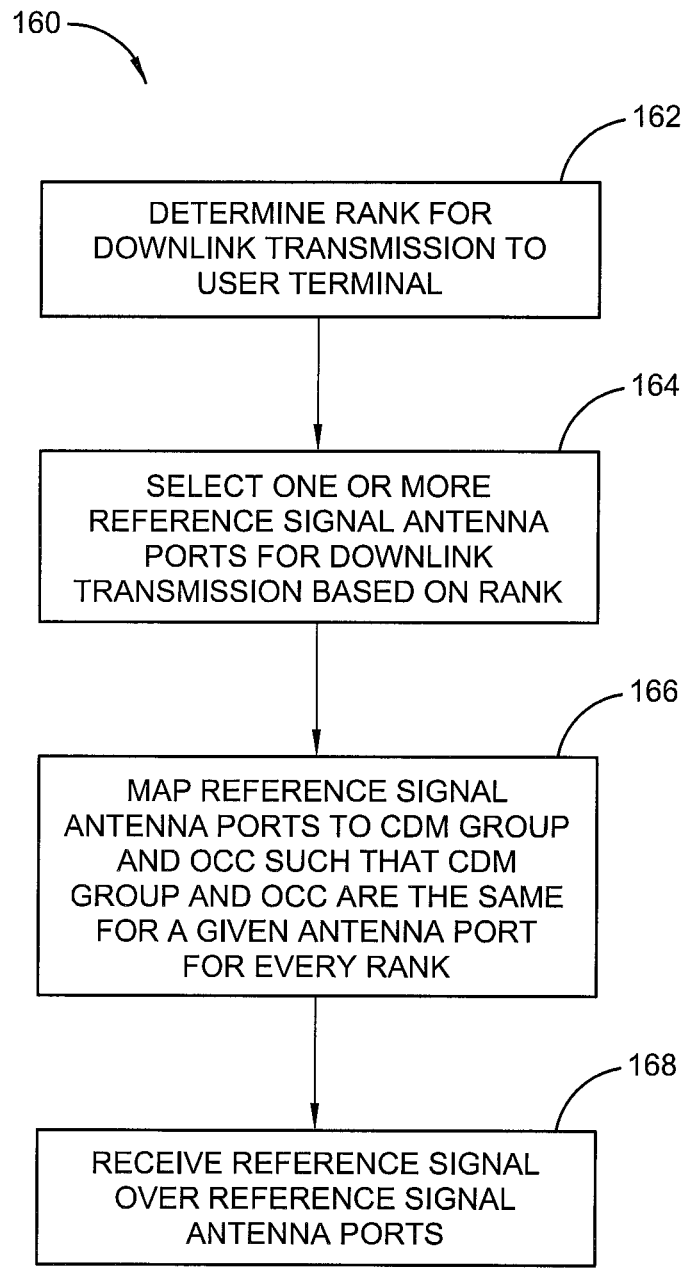
FIG. 8 illustrates a method of receiving demodulation reference signals
Figure 2:
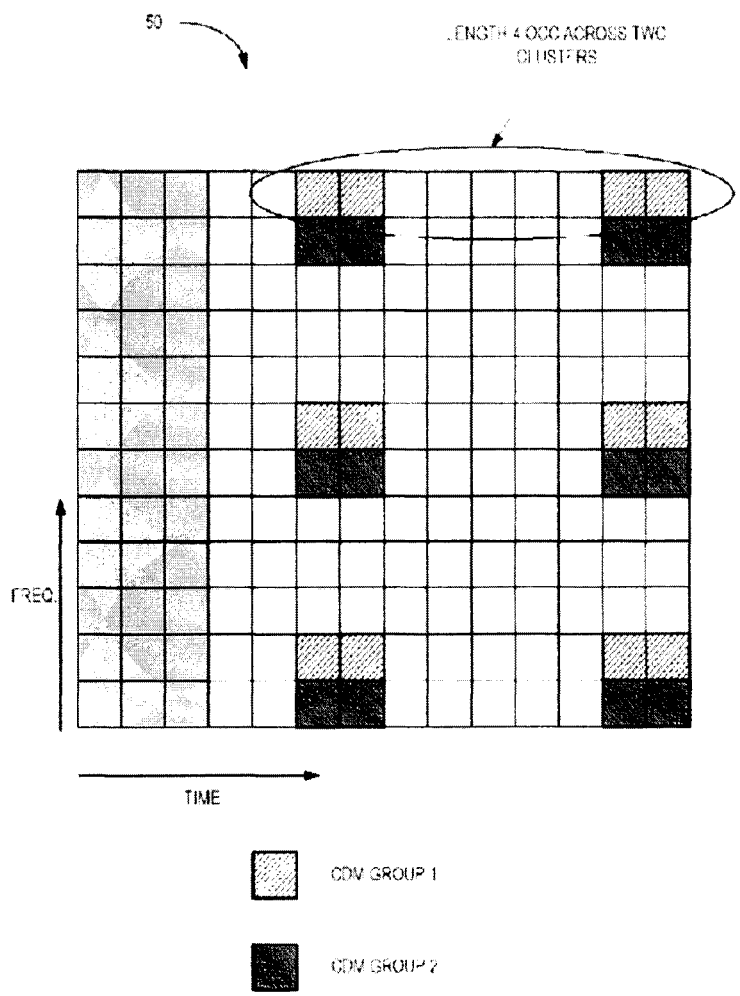
Figure 3:
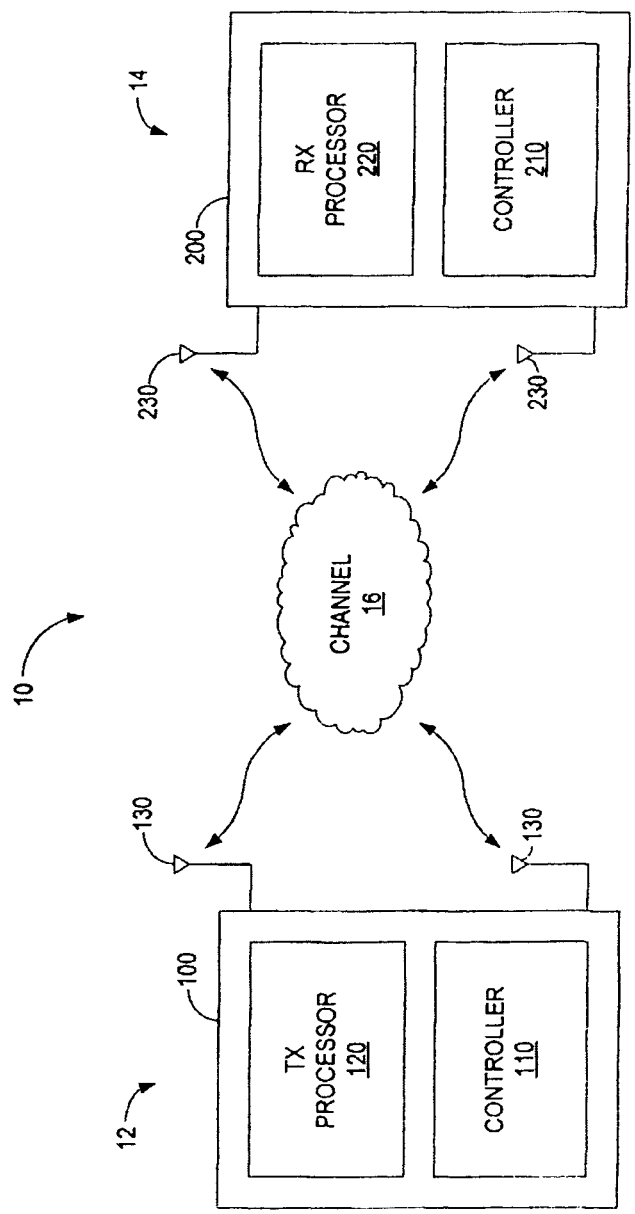

FIG. 8 illustrates an exemplary procedure 160 implemented by a user terminal 14 to receive downlink reference signals from the base station 12. The user terminal 14 determines the transmission rank for the downlink transmission to the user terminal (block 162) and selects one or more reference signal antenna ports based on the transmission rank (block 164). The receive signal processor 230 is configured to map the reference signal antenna ports to a CDM group and OCC such that the CDM group and OCC are the same for a given antenna port for every transmission rank (block 166). The receive signal processor 230 receives the reference signals over the selected antenna ports (block 168) and process the signals.

The antenna port mapping is applicable to both single-user MIMO and multi-user MIMO. It is also applicable to DwPTS and extended CPs, as well as multiple component carriers. The antenna port mapping scheme can be used to reduce the peak power randomization effect.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented by a base station for transmitting demodulation reference signals to a user terminal, said method comprising:
    determining a transmission rank for a downlink transmission to said user terminal;
    determining one or more reference signal antenna ports for said downlink transmission based on said transmission rank, wherein each port is defined by an group/code pair comprising a code division multiplexing group and orthogonal cover code;
    mapping reference signal antenna ports to group/code pairs for each transmission rank such that the code division multiplexing group and code orthogonal cover code are the same for a given antenna port for every transmission rank; and
    transmitting said downlink reference symbols over said reference signal antenna ports corresponding to the transmission rank.

2. The method of claim 1, wherein the mapping of antenna ports to group/code pairs is further configured such that, within a given code division multiplexing group, the antenna ports associated with a low transmission rank will be a subset of the antenna ports associated a higher transmission rank.

3. The method of claim 2, wherein the orthogonal cover codes comprise length-4 cover codes and wherein the mapping of antenna ports to group/code pairs is further configured such that, for selected antenna ports, the length-4 orthogonal cover codes may be decomposed into two length-2 cover codes for channel estimation.

4. The method of claim 2 further comprising sending a control signal to a user terminal to indicate whether channel estimation should be performed using length-2 or length-4 orthogonal cover codes for the selected antenna ports.

5. A method implemented by a user terminal for receiving demodulation reference signals transmitted by a base station, said method comprising:
    determining a transmission rank for a downlink transmission to said user terminal;
    determining one or more reference signal antenna ports for said downlink transmission based on said transmission rank, wherein each port is defined by an group/code pair comprising a code division multiplexing group and orthogonal cover code;
    mapping reference signal antenna ports to group/code pairs for each transmission rank such that the code division multiplexing group and orthogonal cover code are the same for a given antenna port for every transmission rank; and
    receiving said downlink reference symbols over said reference signal antenna ports corresponding to the transmission rank.

6. The method of claim 5, wherein the mapping of antenna ports to group/code pairs is further configured such that, within a given code division multiplexing group, the antenna ports associated with a low transmission rank will be a subset of the antenna ports associated a higher transmission rank.

7. The method of claim 5, wherein the orthogonal cover codes comprise length-4 cover codes and wherein the mapping of antenna ports to group/code pairs is further configured such that, for selected antenna ports, the length-4 orthogonal cover codes may be decomposed into two length-2 cover codes for channel estimation.

8. The method of claim 7 further receiving a control signal from the base station and performing channel estimation using either length-2 or length-4 orthogonal cover codes for the selected antenna ports depending on the control signal.

9. A base station comprising a transmit signal processor and transmit controller configured to:
    determine a transmission rank for a downlink transmission to said user terminal;
    determine one or more reference signal antenna ports for said downlink transmission based on said transmission rank, wherein each port is defined by an group/code pair comprising a code division multiplexing group and orthogonal cover code;
    map reference signal antenna ports to group/code pairs for each transmission rank such that the code division multiplexing group and code orthogonal cover code are the same for a given antenna port for every transmission rank; and transmit said downlink reference symbols over said reference signal antenna ports corresponding to the transmission rank.

10. The base station of claim 9, further configured to map antenna ports to group/code pairs such that, within a given code division multiplexing group, the antenna ports associated with a low transmission rank will be a subset of the antenna ports associated a higher transmission rank.

11. The base station of claim 9, wherein the orthogonal cover codes comprise length-4 cover codes and wherein the mapping of antenna ports to group/code pairs is further configured such that, for selected antenna ports, the length-4 orthogonal cover codes may be decomposed into two length-2 cover codes for channel estimation.

12. The base station of claim 11 further configured to send a control signal to a user terminal to indicate whether channel estimation should be performed using length-2 or length-4 orthogonal cover codes for the selected antenna ports.

13. A user terminal comprising a receive signal processor and receive controller configured to:

determining a transmission rank for a downlink transmission to said user terminal;

determining one or more reference signal antenna ports for said downlink transmission based on said transmission rank, wherein each port is defined by an group/code pair comprising a code division multiplexing group and orthogonal cover code;

mapping reference signal antenna ports to group/code pairs for each transmission rank such that the code division multiplexing group and orthogonal cover code are the same for a given antenna port for every transmission rank; and receiving said downlink reference symbols over said reference signal antenna ports corresponding to the transmission rank.

14. The user terminal of claim 13, further configured to map antenna ports to group/code pairs such that, within a given code division multiplexing group, the antenna ports associated with a low transmission rank will be a subset of the antenna ports associated a higher transmission rank.

15. The user terminal of claim 13, wherein the orthogonal cover codes comprise length-4 cover codes and wherein the mapping of antenna ports to group/code pairs is further configured such that, for selected antenna ports, the length-4 orthogonal cover codes may be decomposed into two length-2 cover codes for channel estimation.

16. The user terminal of claim 15 further configured to receive a control signal from the base station and perform channel estimation using either length-2 or length-4 orthogonal cover codes for the selected antenna ports depending on the control signal.

* * * * *

UNITED STATES PATENT AND TRADEMARK OFFICE
CERTIFICATE OF CORRECTION

PATENT NO.         : 8,446,886 B2
APPLICATION NO.    : 12/900628
DATED              : May 21, 2013
INVENTOR(S)        : Yang Hu et al.

It is certified that error appears in the above-identified patent and that said Letters Patent is hereby corrected as shown below:

In the drawings

Delete Drawing Sheets 2 of 10 and 3 of 10 and substitute therefore with the attached Drawing Sheets 2 of 10 and 3 of 10.

Signed and Sealed this
Sixth Day of October, 2015

Michelle K. Lee
*Director of the United States Patent and Trademark Office*